No. 834,965. PATENTED NOV. 6, 1906.
W. W. CADLE.
PACKING RING FOR FRUIT JARS AND THE LIKE AND METHOD
OF MAKING THE SAME.
APPLICATION FILED JAN. 3, 1906.
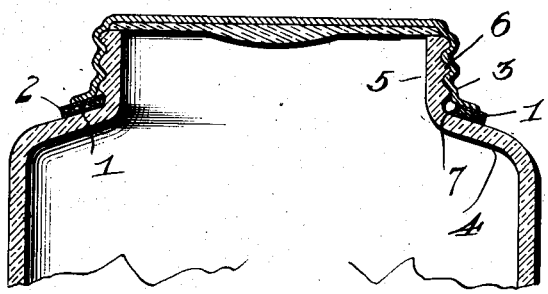
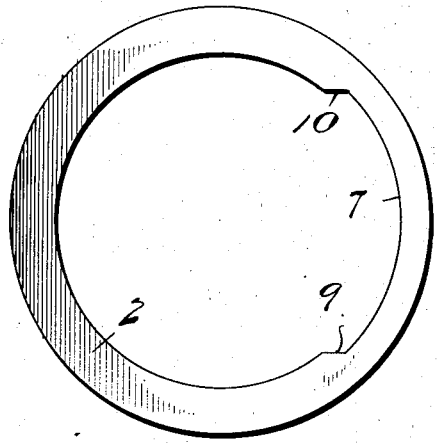
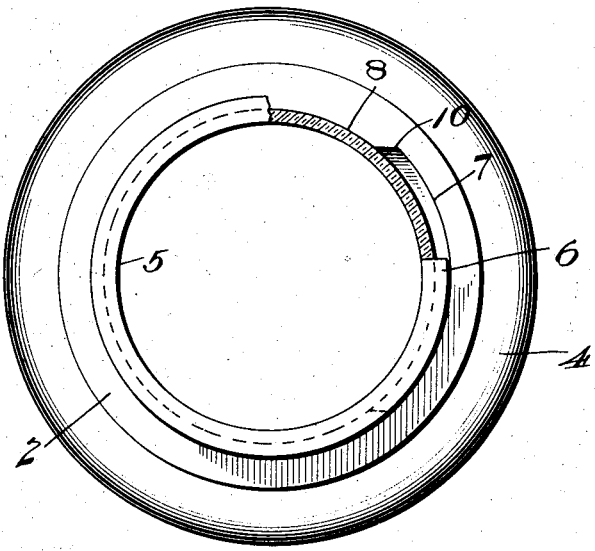
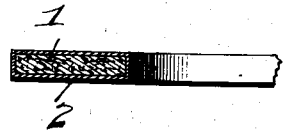
WITNESSES:
INVENTOR:
Wilbert Whittington Cadle
By
Attorney.

UNITED STATES PATENT OFFICE.

WILBERT W. CADLE, OF WILLIAMSBURG, PENNSYLVANIA.

PACKING-RING FOR FRUIT-JARS AND THE LIKE AND METHOD OF MAKING THE SAME.

No. 834,965.　　　　　Specification of Letters Patent.　　　　　Patented Nov. 6, 1906.

Application filed January 3, 1906. Serial No. 294,446.

*To all whom it may concern:*

Be it known that I, WILBERT WHITTINGTON CADLE, a citizen of the United States, residing near Williamsburg, in the county of Blair, State of Pennsylvania, have invented certain new and useful Improvements in Packing-Rings for Fruit-Jars and the Like and Methods of Making the Same, of which the following is a specification.

My invention relates to an improved packing ring or gasket for fruit-jars or the like which when interposed between a jar and its cap or cover is intended to afford means of hermetically sealing the jar.

Packing-rings of the general class referred to are familiar in the art, having been made for a long time of india-rubber, or, more recently, of strawboard provided with a coating of rosin. Numerous objections are apparent in practice to the use of either rubber or of rosin rings. A ring of either rubber or rosin tends to injure the contents of a jar upon which it is used by tainting the contents thereof. When such a ring serves to preserve the seal, it is liable to adhere to the cap and the jar to such an extent as to produce difficulty in separating the cap from the jar. In respect to rosin rings in fact the only way to separate them is by the application of heat. Moreover, the difficulty in the removal of the rosin from the cap and the jar after opening is objectionable in practice. The rubber ring is open to the further objection that it frequently permits the breaking of the seal in consequence of its pliability, which permits it to escape from confinement between the cap and the jar, or on account of its disintegration from any cause.

It is the object of my invention to obviate the disadvantages of rings heretofore employed for sealing fruit-jars or the like by the employment of a compressible ring or gasket consisting, essentially, in respect to its sealing function, of a waxy material, and preferably of paraffin, which is not only suitable for the forming of a seal, but is hygienic, germ-proof, and tasteless.

The properties of paraffin which render it valuable for the purposes in question have been heretofore appreciated; but the nature of the substance has been such as apparently to be prohibitive of its use without the employment of comparatively complicated and expensive jar-closures for confining the material, and thereby rendering its use available.

My invention consists in providing as a vehicle for the paraffin a gasket of such porosity and toughness of substance as will permit the paraffin or the like to entirely permeate the body of the gasket and will at the same time confine it in position to enable and compel the performance of its sealing function. Incidentally for the better performance of this office I employ a gasket of special shape and with a special superficial coating of the material with which it is saturated; but these features I regard as details of my invention, whereof that which constitutes the same will be hereinafter set forth in the following specification and succinctly described in the appended claims.

In the accompanying drawings, which constitute a part of this specification, Figure I is a central vertical section of the upper part of a fruit-jar and its cap in closed position thereon, showing my gasket confined between the cap and the jar, the form of cap and of jar illustrated being presented only for the purposes of explaining the form and function of my gasket. Fig. II is a top plan view of the subject-matter of Fig. I with the cap removed and a portion of the threaded neck of the jar cut away to expose the relationship of the gasket to the neck and its thread. Fig. III is a plan view of the gasket detached. Fig. IV is a sectional view of a fragment of the gasket intended to illustrate the superficial coating with which the gasket is preferably provided.

In describing the method of manufacture of my packing-ring I shall refer to the numerals on the drawings, wherein—

1 indicates a "vehicular" body or base of a ring, being so denominated because it constitutes the vehicle for confining the paraffin or other waxy material in form available for the performance of its functions as a seal. The requisite qualities of the body or base 1 being toughness, porosity, cleanliness, and cheapness, I prefer to make it of wood-pulp, preferably of that class known in the trade as "unbleached sulfite pulp." My method of manufacture consists in subjecting the ring of the desired material and dimensions to a bath of paraffin or like waxy material at a temperature approximately its boiling-point and such as will render it perfectly fluid for a period of time sufficient to effect the complete saturation of the base 1 with the paraffin or the like. The effect of the bath upon the base 1 is to perfectly fill all of the interstices or pores of the material of which the base 1 is made with the paraffin or the like material, thereby converting the base 1 into a fully charged or loaded vehicle for the wax. After the treatment above specified the saturated ring is allowed to cool and in the cooling process is drained, so as to preserve a substantial uniformity of thickness in the saturated ring. When cool, the ring is preferably subjected to a momentary bath in melted wax, preferably paraffin, at a low temperature. The result is to provide a superficial coating 2 of paraffin or the like material upon the ring, which peculiarly adapts it to the performance of its sealing function by providing a coating of pure paraffin upon the surface of the base 1 on all sides, and particularly to come into contact with the opposing faces of a cap 3 and jar 4.

Jars of the class to which my invention is applicable are preferably screw-cap jars of the general type shown in Figs. I and II of the drawings, wherein a neck 5 of the jar is provided with a projecting thread 6. In order to provide for the snug fitting of the ring to the neck 5, I prefer to provide the ring with an inner cut-away portion 7, as shown in Figs. I to III, inclusive, whereby the ring may be readily made to follow the thread 6 of the jar and when seated to closely hug the bottom of the thread 6, as indicated, for instance, by the numeral 8 in Fig. II, except for that portion of the ring in which the cut-away portion 7 is provided. By this means the shoulders 9 and 10 defining such cut-away portion may be disalined and follow the thread 6 without injuriously distorting the ring while it is being applied to position about the neck 5 preparatory to the application of the cap 3, which is shaped to fit and is secured by the thread 6.

It will be readily observed that when my ring, made as above specified, is placed upon the packing-seat of a jar filled with material at a temperature suitable for preserving purposes the heat of the contents will sufficiently melt the paraffin or wax, so that when the cap 3 is applied the ring will effect an hermetical seal between the opposing faces of the cap and jar, as shown in Fig. I.

What I claim is—

1. The method of producing a packing-ring for fruit-jars by saturating a suitably-porous base with waxy material heated to fluidity, and then cooling the saturated base.

2. The method of producing a packing-ring for fruit-jars by saturating a suitably-porous base with waxy material heated to fluidity, cooling the saturated base, and coating the saturated and cooled base with a superficial coating of waxy material.

3. As a new article of manufacture, a packing-ring for fruit-jars or the like consisting of a vehicular base saturated with a waxy material, said base when so saturated being adapted to present and confine in operative relationship between a jar and its cap the waxy material, substantially as and for the purpose specified.

4. As a new article of manufacture, a packing-ring for fruit-jars or the like consisting of a vehicular base saturated with a waxy material and provided with a superficial coating of said waxy material, substantially as and for the purpose specified.

5. As a new article of manufacture, a packing-ring for fruit-jars or the like consisting of a suitably-porous base made of wood-pulp saturated with paraffin-wax.

6. As a new article of manufacture, a packing-ring for fruit-jars or the like consisting of a suitably-porous base made of wood-pulp saturated with paraffin-wax and provided with a superficial coating of the same.

In testimony whereof I have signed my name to this specification in the presence of two subscribing witnesses.

WILBERT W. CADLE.

Witnesses:
A. G. HEYLMAN,
C. M. FORREST.